United States Patent [19]

Saitoh

[11] Patent Number: 5,388,871
[45] Date of Patent: Feb. 14, 1995

[54] FITTINGS WITH BOX NUTS

[75] Inventor: Masahiro Saitoh, Tokyo, Japan

[73] Assignee: Kakizaki Manufacturing Co., Ltd., Tokyo, Japan

[21] Appl. No.: 65,266

[22] Filed: May 21, 1993

[30] Foreign Application Priority Data

May 22, 1992 [JP] Japan .............. 4-034172[U]
Jun. 24, 1992 [JP] Japan .............. 4-043873[U]

[51] Int. Cl.⁶ ............................................. F16L 19/06
[52] U.S. Cl. .................................. 285/247; 285/342; 285/343; 285/423
[58] Field of Search ............. 285/341, 342, 343, 354, 285/423, 334.1, 334.3, 247, 248, 249

[56] References Cited

U.S. PATENT DOCUMENTS

| | | | |
|---|---|---|---|
| 2,439,351 | 4/1948 | Thayer | 285/247 |
| 2,877,027 | 3/1959 | Bagnell | 285/247 |
| 3,030,129 | 4/1962 | Appleton | 285/248 |
| 4,194,768 | 3/1980 | Gretz | 285/247 |
| 4,500,118 | 2/1985 | Blenkush | 285/423 |
| 4,508,374 | 4/1985 | Kantor | 285/423 |
| 4,666,190 | 5/1987 | Yamabe et al. | 285/248 |
| 4,705,304 | 11/1987 | Matsuda et al. | 285/248 |
| 4,729,583 | 3/1988 | Lalikos et al. | 285/247 |
| 5,154,453 | 10/1992 | Nishio | 285/423 |

FOREIGN PATENT DOCUMENTS

| | | |
|---|---|---|
| 8-9975 | 7/1933 | Japan . |
| 60-126790 | 8/1985 | Japan . |
| 60-126791 | 8/1985 | Japan . |
| 62-86489 | 6/1987 | Japan . |
| 62497 | 3/1990 | Japan .................. 285/248 |
| 62498 | 3/1990 | Japan .................. 285/248 |
| 2-117494 | 9/1990 | Japan . |

Primary Examiner—Eric K. Nicholson
Attorney, Agent, or Firm—Oliff & Berridge

[57] ABSTRACT

A resin-made detachable fitting to which a tube is connected. The fitting comprises a core of a cylindrical or ring shape forcibly inserted into the tube end to expand it, a fitting body having an inner passage, and a box nut able to mesh with ends of the fitting body and connecting the tube end to the fitting body. The fitting body comprises a cylindrical socket portion axially cylindrically extending from the fitting body ends and having an outer diameter equal to the inner diameter of the core. The socket portion has a sealing surface at its end. The fitting body further comprises a cylindrical securing portion axially extending from the fitting body ends and formed coaxially around the socket portion to form an insertions space. The securing portion has a securing wall facing the socket portion and holding, together with the socket portion, the tube inserted into the insertion space. The box nut comprises a holding surface facing the sealing surface. The box nut further has a female thread part on its inner surface and a polygonal thread head portion for turning it on its outer surface. The thread head portion is different in axial position from the female thread part and an outer surface which faces the female thread part is a complete round.

29 Claims, 4 Drawing Sheets

FITTINGS WITH BOX NUTS

FIELD OF THE INVENTION

The present invention relates to a fitting, made of resin, to which one or more tubes are connected for supplying liquids such as chemicals (for instance, sulfuric acid) to given places and from which the tube can be easily disconnected when maintenance and other things are required.

BACKGROUND OF THE INVENTION

In various pipe arrangements, fittings have been widely used for connecting tubes and connecting a tube to a device. Among them, a detachable type of fitting is frequently preferenced over other types.

One of the detachable types of fittings conventionally used is shown in FIG. 1. In FIG. 1, a reference numeral 1 represents a fitting body, reference numeral 2 an inner ring, reference numeral 4 a box nut, and reference numeral 5 a tube, respectively. One end of the inner ring 2 is forcibly inserted into the tube 5 and the other end of it is forced into an inserting opening 1A of the fitting body 1. Then the box nut 4 is turned and meshed outside the fitting body 1 so that a pressure edge 4A of the nut 4 puts pressure onto an expanded portion 6 of the inner ring 2 to seal the gap between the inner ring 2 and the fitting body 1 and to prevent coming off of the tube 5.

The box nut 4, having a certain length in its axial direction, has a female thread part 4B on its inner circumferential surface and a head portion 4C on its outer circumferential surface, the head portion 4C being used for turning the box nut 4 itself. Usually the head portion 4C is formed into an octagonal or hexagonal shape. In addition, on the box nut 4, both of the female thread part 4B and the head portion 4C are positioned over the same length region in the axial direction.

Prior art showing the above axial positional relation between the female thread part 4B and the head portion 4C is disclosed, for example, in Japanese utility model laid-open (KOKAI) publication No. 2-117494.

For the above-mentioned resin fitting shown in FIG. 1, since high temperature chemicals, such as sulfuric acid, sometimes flow therethrough, sealing performance of the fitting becomes an important factor. However, ill the above-mentioned fitting, there are two places which must be sealed; one is an aperture 7 between the inner ring 2 and the fitting body 1 and the other an aperture 8 between the inner ring 2 and the tube 5. The possibility of leakage will be increased with an increase in the number of sealed places.

The apertures between the tube 5 and the inner ring 2 and between the tube 5 and the inner surface of the inserting opening 1A are the secondary places to be sealed, the tube 5 is mainly held not to come off by the pressure edge 4A of the box nut 4. As a result, when the tube 5 is softened due to the flow of high temperature chemicals, it is difficult for the pressure edge 4A to retain a secure hold and to prevent the tube 5 from coming off.

Axial one end of the inner ring 2 is faced to a passage and pressed by the pressure edge 4A (refer to the left-side end in FIG. 1). Hence, the end may be softened and bent inward because of high temperature liquids flowing therethrough, which will cause increased resistance of the passage and decreased sealing properties.

Further, for the box nut 4, the female thread part 4B and the head portion 4C are formed inside and outside of the same axially-positioned cylindrical portion of the box nut 4, respectively. Thus the thickness of the cylindrical portion differs place to place in its circumferential direction. In detail, the thickness at the center of a flat surface of the head portion 4B (octagon or hexagon in cross section) is thinner than that at the edges of the flat surface. On one hand, resin materials show greater coefficients of thermal expansion and contract at constant coefficents of contraction during a cooling process of injection moulding. In this contraction, changes in thickness of the resin material cause different actual sizes in contraction, even though the contraction rate of a resin material is uniform. Namely, there is a difference in the amount of contraction from place to place in the circumferential direction of the box nut 4. This causes sinking, which sometimes results in deteriorating the roundness of the female thread part 4B. This lack of roundness will lead to nonuniformity of tightening force by the box nut 4, thus causing a situation in which the tube 5 easily comes off or falls off and the aforementioned two apertures 7 and 8 to be sealed are substantially lowered in sealing properties.

As discussed above, the conventional resin fitting has a drawback of lowered reliability.

SUMMARY OF THE INVENTION

Accordingly, it is a primary object of the present invention to improve reliability of a resin fitting by not only increasing sealing properties but securely preventing a tube to be connected from coming off, even when liquids of high temperatures flow therethrough.

It is a further object of the present invention to provide an improved resin fitting with a box nut with which tightening force is uniform in its circumferential direction.

According to one aspect of the present invention there is provided a resin-made fitting to which a hollow tube having an end of an inner diameter and an outer diameters is connected to form a continuous passage therethrough, the fitting comprising: a core formed into either one of a cylindrical shape and a ring shape having an inner diameter larger than the inner diameter of the tube and forcibly inserted into the end of the tube to expand the end; a fitting body having an inner passage formed along an axial direction of the fitting body for forming a part of the continuous passage, the inner passage having a diameter at least as large as the inner diameter of the tube; and a box nut able to mesh with the fittig body and connecting the end of the tube to the fitting body, wherein the fitting body comprises a cylindrical socket portion axially extending from an end of the fitting body and having an outer diameter equal to the inner diameter of the core, the socket portion having a sealing surface at an end of the socket portion for sealing an aperture between the tube and the socket portion when the tube is pressed to the sealing surface, and a cylindrical securing portion axially extending from the end of the fitting body and formed coaxially around the socket portion and forming an insertion space between the socket portion and the securing portion, the securing portion having a securing wall facing the insertion space and holding, together with the socket portion, the tube inserted into the insertion space, and the box nut having a holding surface facing to the sealing surface.

Preferably, the fitting body has a male thread part on an outer circumferential surface, the box nut has a female thread part on an inner circumferential surface, and pressing surfaces of said male and female thread parts are formed perpendicular to the axial direction.

It is preferred that the female thread part is formed on the inner circumferential surface of the box nut and a polygonal thread head portion for turning the box nut is formed on the outer circumferential surface of the box nut, the thread head portion being different in axial position from the female thread part and a portion of the outer circumferential surface facing the female thread part being formed as a complete round in cross section perpendicular to the axial direction.

It is also preferred that at least one of the securing wall and an outer circumferential surface of the core has a plurality of non-slip grooves. The outer surface of the core comprises a first tapered, upgrade surface and a second tapered, downgrade surface. Preferably, both of the sealing surface and holding surface are curved at a same curveture, are flat and perpendicular to the axial direction, or are inclined outward. Still preferably, the end of the tube is folded inward along a side of the core forcibly inserted into the tube. Further the core has a flange portion that contacts an end of the tube.

It is also preferred that the resin be comprised of one of a poly tetrafluoroethylene(PTFE), a poly propylene(PP), a poly etheretherketone(PEEK), and a poly phenylene sulfide(PPS). Preferably, the tube is made of a resin material.

The fitting may have two tubes, each attached to an end of a fitting having a socket portion, securing portion, core, and box nut.

According to another aspect of the present invention, there is provided a box nut, made of resin, having inner and outer circumferential surfaces in an axial direction of the box nut, the box nut comprising: a female thread part for meshing with a male thread part, the female thread part being formed on the inner circumferential surface; and a polygonal thread head portion for holding and tightening the box nut, the thread head portion being formed on the outer circumferential surface, wherein the thread head portion is different from an outer circumferential surface portion facing to the female thread part and the outer circumferential surface portion is formed so as to be a complete round in cross section perpendicular to the axial direction.

BRIEF DESCRIPTION OF THE DRAWINGS

The accompanying drawings which are incorporated in and constitute a part of this specification, illustrate one embodiment of the invention and, together with the description, serve to explain the principles of the invention.

OF THE DRAWINGS

Figure 1:
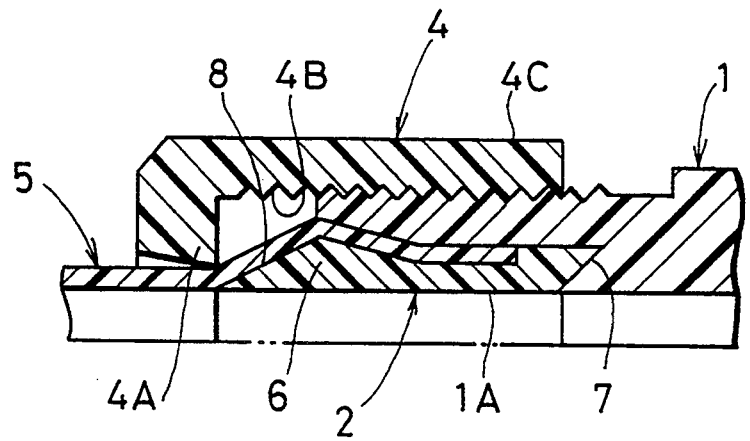
Figure 2:
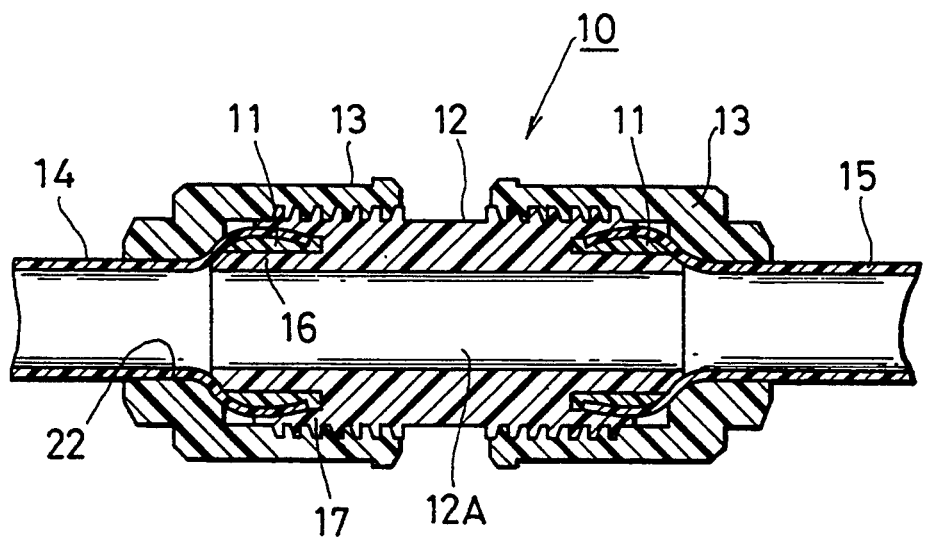
Figure 3:
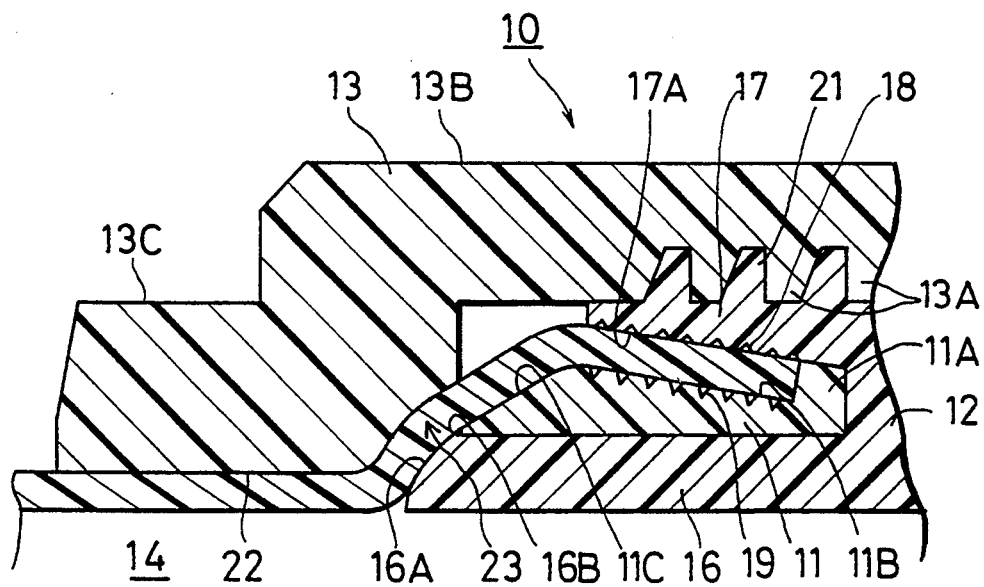
Figure 4:
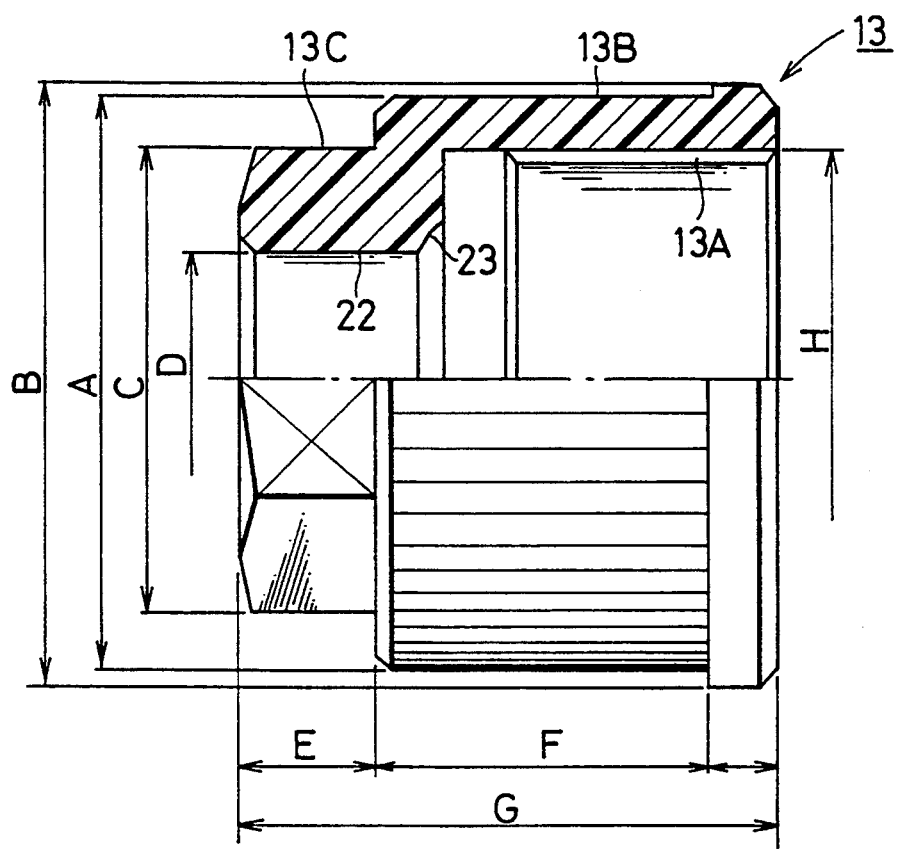
Figure 5:
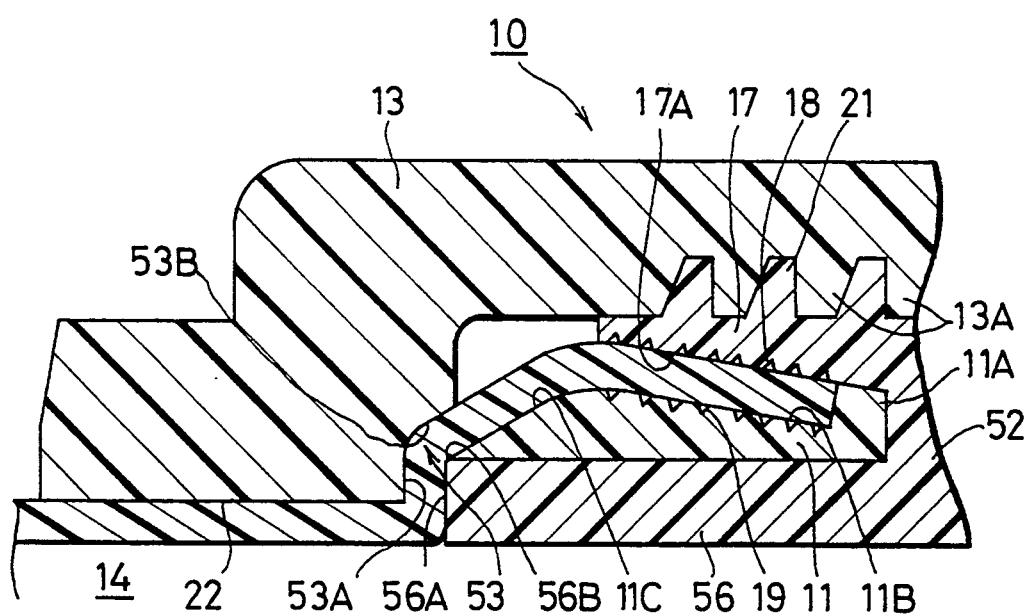
Figure 6:
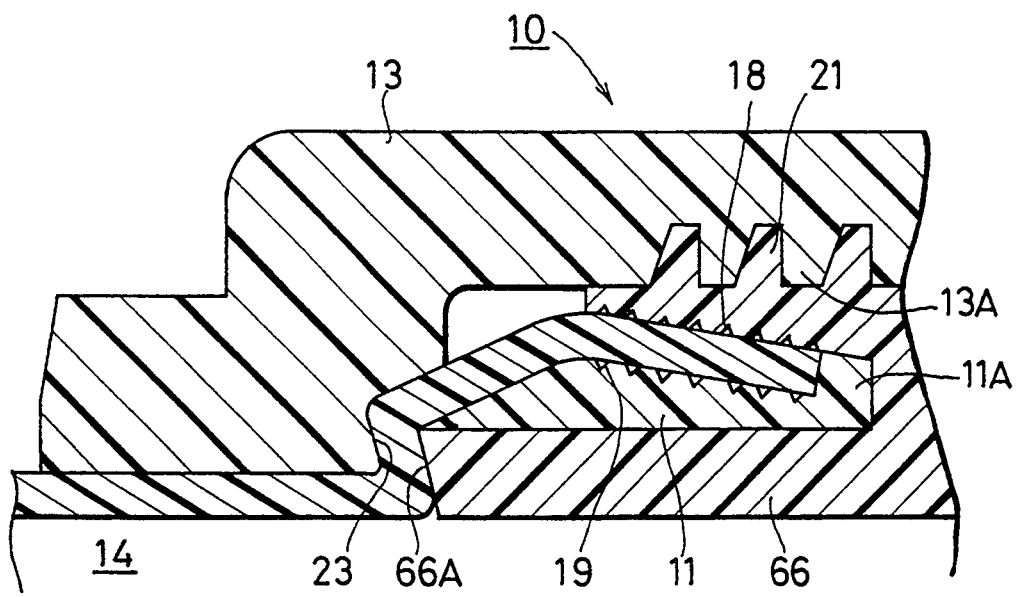
Figure 7:
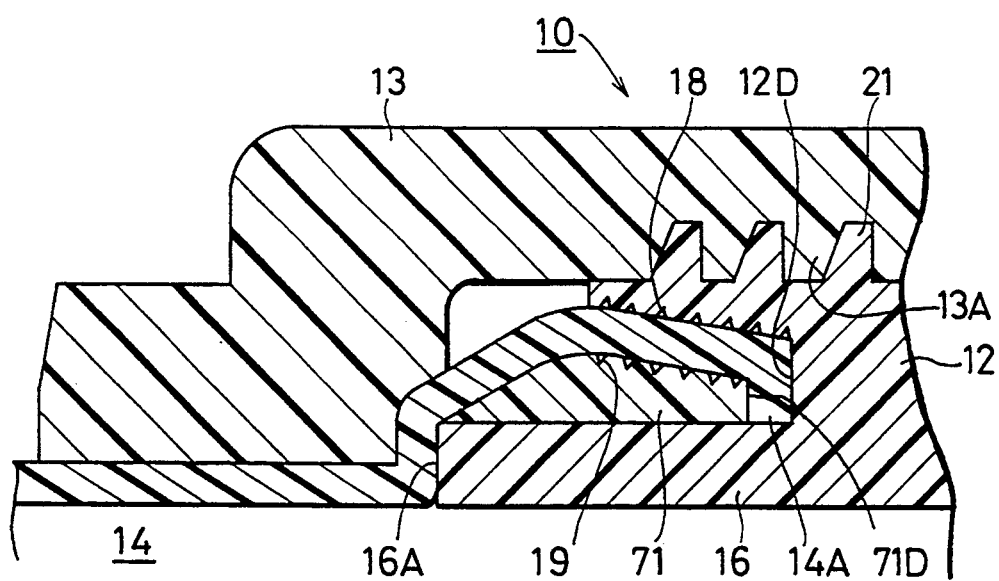

FIG. 1 is an axial cross-sectional view showing a part of a fitting according to prior art;

FIG. 2 is an axial cross-sectional view of a fitting according to an embodiment of the present invention;

FIG. 3 is an enlarged, axial cross-sectional view showing a part of a fitting of FIG. 2;

FIG. 4 is a partially-cut, axial cross-sectional view of a box nut used for the fitting;

FIG. 5 represents a partial, axial cross-sectional view of a fitting according to a first modification of the invention;

FIG. 6 represents a partial, axial cross-sectional view of a fitting according to a second modification of the invention; and FIG. 7 represents a partial, axial cross-sectional view of a fitting according to a third modification of the invention.

DESCRIPTION OF THE PREFERRED EMBODIMENTS

An embodiment of the present invention will now be described according to FIGS. 2 to 4.

FIG. 2 shows a resin-made fitting 10 in accordance with the present embodiment. The fitting 10 consists primarily of a core 11, a fitting body 12 having a generally cylindrical shape, and a box nut 13. In this embodiment, the fitting 10 is designed to connect two tubes 14 and 15, and the a core 11 and box nut 13 are placed at both ends of the fitting body 12, respectively. As both the ends of the fitting body 12 are the same in construction, one end (to which the tube 14 is connected) will now be a main object to be described hereinafter. The tubes 14 and 15 are made of synthetic resin having elasticity.

The core 11, as shown in FIGS. 2 and 3, is formed into an approximate cylinder and forcibly inserted into the inside of one end of the tube 14 to expand the end. The inner diameter of the core 11 is larger than that of the tube 14, and is the same as an outer diameter of a socket portion 16 extending from the fitting body 12, so that the socket portion 16 can be inserted into the core 11. As shown in FIG. 3, the core 11 has a flange portion 11A at its one end (a right side in FIG. 3), the flange portion 11A being in contact with and holding the edge of the tube 14 when the core 11 is inserted therein. From the flange portion 11A to a given point on the way to its opposite end in an axial direction of the core 11, the diameter of the outer circumferential surface is gradually increased, thus this diameter-increased portion making a first tapered surface 11B: from the given point to the opposite end, its diameter is gradually decreased, thus this diameter-decreased portion making a second tapered surface 11C. As a whole, the outer circumferential surface of the core 11 is expanded like a mountain-shape in its axial section. In cooperation with a securing wall 17A of a securing cylindrical portion 17 extending from the end of the fitting body 12, the first tapered surface 11B holds the end of the tube 14 by tight clipping.

The fitting body 12, as shown in FIG. 2, is provided with a cylindrical inner space as an inner passage 12A. The passage 12A makes up a continuous passage through the tubes 14 and 15. The diameter of the inner passage 12A is equal to the inner diameter of the tubes 14 and 15. In order to attach it to the core 11, the fitting body 12 has the above-said socket portion 16 at both of its axial ends, respectively. As shown in FIG. 3, the socket portion 16 is formed so as to be an extention of the inner passage 12A and is the same in diameter as the tube 14. The end of the socket portion 16 is provided with a sealing surface 16A shaped into a gentle curved surface. Taking account of the high sealing properties and physical strength, a preferable width of the sealing surface 16A (i.e., thickness of the socket portion 16) is designed to be approximately two times larger than the thickness of the tube 14.

The aforementioned securing cylindrical portion 17 is extended, at the radially outer positon of the socket portion 16, from the end of the fitting body 12, approximately in parallel with the socket portion 16. The space between both portions 16 and 17 becomes an insertion space for the tube 14. The inner wall portion of the cylindrical portion 17 makes the securing wall 17A. This securing wall 17A is face-to-face to the first tapered surface 11B of the core 11 installed onto the socket portion 16 and is tapered in the same manner. The securing wall 17A is designed for holding the tube 14 in cooperation with the first tapered surface 11B. To secure the holding, a large number of grooves 18 ... 18 for non-slipping are formed over the entire wall 17A. In addition, a large numer of non-slipping grooves 19 ... 19 are also formed over the first tapered surface 11B. Hence, when the core 11 is forcibly inserted into the end of the tube 14 and then fitted onto the socket portion 16, the end of the tube 14 is firmly held and clipped by the first tapered surface 11B and the securing wall 17A, thus the tube 14 is prevented from coming off or falling off.

A male thread part 21, which can be meshed with the box nut 13, is formed on the outer circumferential surface of the fitting body 12. The male thread part 21 is formed such that pressing surfaces between a later-described female thread part 13A of the box nut 13 and the male thread part 21 are directed perpendicularly to a rotationally moving direction (i.e., the axial direction) of the box nut 13. The "pressed surfaces" are hereinafter referred to as surfaces strongly pressed when force operates in a direction (direction for the left side in FIG. 3) along which the box nut 13 in mesh with the fitting body 12 is pulled out. In FIG. 3, the pressing surfaces are the right side surface of threads of the male thread part 21 and the left side surface of threads of the female thread part 1SA. In regard to the axially opposite side (i.e., the side of the tube 15) of the fitting body 12, the right and left sides of the pressed surfaces are changed with each other.

The box nut 13 has an inserting opening 22 at one the left-side in FIG. 3) of its axial sides, through which the tube 14 is inserted. At one of the inside edges of the inserting opening 22 (at the right-side edge in FIG. 3), a holding surface 23 is formed for pushing the tube 14 to the sealing surface 16A of the socket portion 16. The holding surface 23 curves at the same curvature as the sealing surface 16A. Thus, the tube 14 is held by the pressure between the holding surface 23 and the sealing surface 16A, and pressing the inside of the tube 14 to the sealing surface 16A seals the passage and prevents the tube 14 from coming off. Further, the holding surface 23 pushes the core 11 via the tube 14, thus the core 11 is wedged into the insertion space between the socket portion 16 and the securing cylindrical portion 17. This generates a pressure by which the first tapered surface 11B of the core 11 is pressed to the securing wall 17A so as to clip the end of the tube 14 therebetween, thus preventing the coming off of the tube 14. During such holding, the non-slipping grooves 18 ... 18, 19 ... 19 formed on both the surfaces 11B and the wall 17A can bite the tube 14 to hold it. On the inner circumferential surface of the box nut 13, the aforementioned female thread part 13A is formed at its meshing portion with the fitting body 12, the female thread part 13A being able to engage with the male thread part 21 of the fitting body 12.

Moreover, the radially outer surface of the box nut 13 facing the female thread part 13A, as shown in FIG. 4, is formed as an outer circumferential surface 13B of a complete round shape. The outer circumferential surface 13B is centered at the same point as the female thread part 13A having also a complete round shape in radial cross section. Hence, the thickness between the outer circumferential surface 13B and the female thread part 13A is allowed to be uniform at any point over the circumferential surface. Further, to fasten the box nut 13 onto the fitting body 12, a thread head portion 13C is formed at the opposite side (at the left side in FIG. 4) to the outer circumferential surface 13B. Namely, the thread head portion 13C is axially totally apart from female thread part 13A. The thread head portion 13C is shaped into an octagon or hexagon in radial cross section. Therefore, the uniform thickness of the female thread part 13A permits its resin material to contract at an equal rate over all the circumferential surface during injection molding. As a result, sinking is prevented and the female thread part 13A retains its uniform round shape.

An example of dimensions of the box nut 13 can be shown as follows: the diameter A of the outer circumferential surface 13B is 43 mm, the maximum diam. B is 44 mm, the length C of the thread head portion 13C is 30 mm, the inner diam. D of the inserting opening 22 is 19.2 mm, the height E of the portion 13C is 10 mm, the height F of the surface 13B is 25 mm, the entire height G of the box nut 13 is 40 mm, and the inner diam. H of the female thread part 13A is 34 mm.

As materials of the box nut 13, various synthetic resins can be adopted. It may be possible to select a proper resin according to uses, operating conditions, etc. of the box nut. In particular, it is desirable to specify resin materials in consideration of their features as follows:

(1) PTFE(poly tetrafluoroethylene),
(2) FEP(flurinated ethylene propylene),
(3) PFA(perfluoroalcoxy),
(4) ETFE(ethylene-tetrafluoroethylene),
(5) PCTFE(poly chlorotrifluoroethylene),
(6) PVDF(polyvinylidne fluoride),
(7) PP(poly propylene),
(8) PEEK(poly etheretherketone), and
(9) PPS(poly phenylene sulfite).

Furthermore, the components of the resin fitting 10 may use the same materials as the box nut 13 as abovementioned.

On the other hand, the other joint part for the tube 15 is constructed in the same manner as above.

When connecting the tubes 14 and 15, first the diameters of their ends are extended by forcibly inserting the cores 11 and 11, respectively. Each of the cores 11 and 11 is inserted until the end of the tube 14 (15) reaches its flange portion 11A. Then the cores 11 and 11 in the tubes 14 and 15 are each inserted into the insertion spaces of the fitting body 12. Then each of the box nuts 13 are and 13 meshed with the securing cylindrical portion 17 of the fitting body 12, the thread head portion 13C being securely tightened with tools such as a spanner.

This mesh of the box nut 13 enables its holding surface 23 to press the tube 14 (15) tight to the sealing surface 16A of the socket portion 16. This gives a seal to the sealing surface 16A. Besides, the tube 14 (15) is held by both the surfaces 23 and 16A to prevent the tube 14 (15) from coming off or dropping off. At the same time, the holding surface 23 should press the base end portion of the core 11, which causes a wedged insertion of the core 11 between the socket portion 16 and securing cylindrical portion 17. Hence, the tube 14 (15) is tightly held at its end portion by clipping of the first tapered surface 11B and securing wall 17A, thus the tube 14 (15)

being more securly fastened and prevented from coming off.

Owing to the fact that pressed surfaces of the female and male thread part 13A and 21 are formed perpendicularly to the rotationally moving direction of the box nut 13 and the female thread part 13A is retained in a complete round, both the thread parts 13A and 21 should securely mesh with each other. Therefore, once the box nut 13 is fastened, it will not loosen in almost every case. On top of it, the sealing surface 16A should be pressed at a constant and uniform force over its area by the holding surface 23.

As seen in FIG. 1 illustrating a conventional fitting, both thread parts each consist of threads having tapered surfaces at both of the axial sides. In this case, when softened by heat, a gap may occur between the contacting surfaces of the threads even if had been fastened, thus generating lifting. On one hand, the conventional female thread part 4B is not an exactly complete round at its internal circumferential surface, sometimes causing ununiformity in the tightening force. This resulted frequently in coming off of the tube owing to the loosened threads. In contrast, in the embodiment, because the pressed surfaces of the thread parts 13A and 21 are formed at a right angle and the female thread part 13A is formed in a complete round (at the inner circumferential surface) with no sinking, it is certainly possible to prevent the above lifting and uneven tightening. This prevents the box nut 13 from loosening and the tubes 14 and 15 from being out of place.

Besides, the core 11 is not faced to the passage on account of support by the socket portion 16. This should be able to avoid not only an increase in passage resistance due to deformed cores, which was frequently seen in prior art, but also a decrease in sealing properties.

As having been described so far, the tubes 14 and 15 can be easily connected and prevented from coming off, and the passage may be highly sealed. This increases greatly the reliability of the fitting.

On the other hand, the tubes 14 and 15 will be easily disconnected from the fitting 10 by just loosening and drawing out the box nuts 13 and 13. This is advantageous to the fitting 10 installed at narrow spaces caused by, for instance, existence of various devices therein. Even for such cases, it is possible to connect and disconnect the fitting 10 with ease and to improve work efficiency for installation and maintenance.

Further, when repeating connection and disconnection of the tubes 14 and 15, lesser mechanical load is imposed to them, thus contributing to increased sealing properties.

Referring now to FIGS. 5 to 7, modifications of the present invention will be explained.

A first modification is exemplified in FIG. 5. In the above embodiment, the sealing surface 16A of the socket portion 16 is curved. But, in FIG. 5, a sealing surface 56A is formed perpendicular to the axial direction of a fitting body 52. A holding surface 53 consists of a vertical surface portion 53A for sealing a passage and a tube-holding surface portion 53B shaped into a curve; the vertical surface portion 53A faces the sealing surface 56A formed into a surface perpendicular the axial direction of the fitting 10 and clips the tube 14, at the tube-holding surface portion 53B surrounding the external edge 56B of the sealing surface 56A (that is, the external edge portion of the end of a socket portion 56) to prevent the tube 14 from coming off by pressing it to the external edge 56B. The tube 14 is clipped and held by the vertical surface portion 53A and the sealing surface 56A for bringing the surface 56A and the inner surface of the tube 14 into a firm contact to seal the passage. On top of it, the tube 14 is clipped by the tube-holding surface portion 53B and the external edge 56B for stopping the tube from coming off. On account of sealing properties, the height of the above sealing surface 56A (corresponding to the thickness of the socket portion 56) is at least two-times larger than the thickness of the tube 14.

A second modification is illustrated in FIG. 6. In the above embodiment, the sealing surface 16A is formed perpendicular to the axial direction of the fitting body 12. However, the present invention should not be limited to this. As seen in FIG. 6, in case that the tubes 14 and 15 have enough elasticity, the sealing surface 66A of a socket portion 66 may be slightly inclined. The inclination is toward the left side in FIG. 6, so that the end of the socket portion 66 increases its diameter (namely, moves slightly to a radially outward direction: upward in FIG. 6).

A third modification is illustrated in FIG. 7. In the above embodiment, the core 11 has its flange portion 11A. As shown in FIG. 7, however, a core 71 has no flange portion. Instead of the flange portion 11A, the end of the tube 14 will be folded inward at the edge of the core end. Then the core 71 is attached onto the socket portion 16 for holding the folded end of tube 14 between a one-side 71D of the core 71 and a bottom 12D of the fitting body 12. This provides a more secure support of the tube 14. In this case, the sealing surface 16A can adopt, as its shape, any one described hereinbefore.

The modifications thus-described also present the equivalent functions and advantages to the aforementioned embodiment.

A number of further modifications can be possible as follows.

In the above embodiment and modifications, the connection of the two tubes 14 and 15 are shown. Further, the present invention is possible for a situation in which only one tube 14 is used; one of the tube-connecting parts according to the present invention is formed on a fitting and the other is formed rigidly with a device. Such devices include a valve, a pump and a filter.

It is also allowed to have three or more of the tube-connecting parts according to the present invention for one fitting, thus a multi joint of tubes being provided. It is also possible to use a relatively long fitting body in its axial direction which is bent by, for instance, a right angle.

Further, in the above embodiment and modifications, the inner passage 12A is the same in diameter as the tube 14. However, it is allowed to make the diameter of the inner passage 12A larger than that of the tube 14. In such situation, the diameter of the inner passage 12A is designed as, follows, for example. Because of resin-made, the fitting body 12 tends to be slightly deformed. Particularly, the socket portion 16 may cause a radially slight contraction by contracting forces given by the tube 14 and tightening the box nut 13. The degree of contraction depends on factors including a shape of resin fittings and the properties of materials used. Thus, the degree of contraction of the socket portion 16 is precalculated, and the inner diameter of the socket portion 16 is specified so that it becomes the same size as the tube 14 after the contraction. In addition, in a case in which the whole inner passage 12A is set to be an equal diameter, a deformation is possible in which only the socket portion 16 is beforehand increased in diameter on account of its contraction and a uniform diameter therethrough. In such a diameter increase in advance, the diameter of the socket portion 16 increases toward the axial end, that is, a tapered inner wall. As a result, when the ends of the socket portion 16 are bent in radially inward, the ends are certainly prevented from protruding out into the passage and from giving passage resistance. In regard to the diameter of the socket portion, only in the second modification shown in FIG. 6, is the socket portion 66 decreased in inner diameter relative to the tube 14.

It will be apparent to those skilled in the art that various other modifications and variations could be made in the fitting of the invention without departing from the scope or spirit of the invention.

What is claimed is:

1. A resin-made fitting to which at least one hollow tube is connected to form a continuous passage therethrough, the fitting comprising:
    a core having an annular cross-section with an inner diameter larger than the inner diameter of the tube, the core being forcibly inserted into an end portion of the tube to expand the end portion;
    a fitting body having an inner passage formed along an axial direction of the fitting body for forming a part of the continuous passage, said inner passage having an inner diameter at least as large as the inner diameter of the tube, said fitting body comprising;
    a cylindrical socket portion extending axially from the fitting body and having a sealing surface at an axial end which contacts an inner surface of the tube, the socket portion having an outer diameter equal to the inner diameter of the core; and
    a cylindrical securing portion extending axially from the fitting body and arranged coaxially around the socket portion to form an annular insertion space between the securing portion and the socket portion to receive the core and the end portion of the tube, the core surrounding the socket portion, and the end portion of the tube located between the core and the securing portion;
    a box nut connecting the end portion of the tube to the fitting body, said box nut being formed to mesh with the fitting body and having a holding surface formed to mate with the sealing surface when the box nut is meshed with the fitting body so that the tube is gripped between the holding and sealing surfaces.

2. The fitting of claim 1, wherein said axial end of the socket portion has a thickness at least two times the thickness of the tube.

3. The fitting of claim 1 wherein the fitting body is symmetrical and has two axial ends, each axial end having a socket and securing portion for receiving a core and meshing with a box nut for attaching a hollow tube to each axial end of the fitting body.

4. The fitting of claim 3, wherein said fitting body is axially straight.

5. The fitting of claim 1, wherein both of said sealing surface and holding surface are curved at a same curvature.

6. The fitting of claim 1, wherein both of said sealing surface and holding surface are flat and perpendicular to said axial direction.

7. The fitting of claim 1, wherein both of said sealing surface and holding surface are inclined outward relative to the axial direction.

8. The fitting of claim 1, wherein said end portion of the tube is folded inward toward the socket portion along an axial end of the core.

9. The fitting of claim 1, wherein the core has a flange portion at an axial end thereof which is in contact with an end face of the tube.

10. The fitting of claim 1, wherein said resin is comprised of a material selected from the group consisting of poly tetrafluoroethylene (PTFE), polypropylene (PP), poly etheretherketone (PEEK), and poly phenylene sulfite (PPS).

11. The fitting of claim 1, wherein said tube is comprised of a resin material.

12. The fitting of claim 1, wherein said fitting body has two axial end portions, and said socket and securing portions are formed at one of said two axial ends of the fitting body.

13. A resin-made fitting to which at least one hollow tube is connected to form a continuous passage therethrough, the fitting comprising:
    a core having an annular cross section with an inner diameter larger than the inner diameter of the tube, the core being forcibly inserted into an end portion of the tube to expand the end portion, the core having an outer circumferential surface contacting an inner surface of the end portion of the tube;
    a fitting body having an inner passage formed along an axial direction of the fitting body for forming a part of the continuous passage, said inner passage having an inner diameter at least as large as the inner diameter of the tube, the fitting body comprising:
    a cylindrical socket portion extending axially from the fitting body and having a sealing surface at an axial end which contacts an inner surface of the tube, the socket portion having an outer diameter equal to the inner diameter of the core; and
    a cylindrical securing portion extending axially from the fitting body and arranged coaxially around the socket portion to form an annular insertion space between the securing portion and the socket portion to receive the core and the end portion of the tube, the core surrounding the socket portion, and the end portion of the tube located between the core and the securing portion;
    a box nut connecting the end portion of the tube to the fitting body, said box nut being formed to mesh with the fitting body and having a holding surface formed to mate with the sealing surface when the box nut is meshed with the fitting body so that the tube is gripped between the holding and sealing surfaces;
    the outer circumferential surface of the core having a first tapered surface beginning at a first axial end of the core near an end face of the tube and having a gradually increasing outer diameter in the axial direction into the tube, and a second tapered surface beginning at a second opposite axial end of the core and having a gradually increasing outer diameter in the axial direction out of the tube, said first and second tapered portions joining at an intermediate outer surface portion of the core; and
    a plurality of non-slip grooves formed on the first tapered surface of the core and the securing portion.

14. The fitting of claim 13, wherein said end portion of the tube is folded inward toward the socket portion along an axial end of the core.

15. The fitting of claim 13, wherein the core has a flange portion at an axial end thereof which is in contact with an end face of the tube.

16. The fitting of claim 13, wherein said resin is comprised of a material selected from the group consisting of poly tetrafluoroethylene (PTFE), poly propylene (PP), poly etheretherketone (PEEK), and poly phenylene sulfite (PPS).

17. The fitting of claims 13, wherein said tube is comprised of a resin.

18. The fitting of claim 13 wherein said fitting body has two axial end portions, and said socket and securing portions are formed at one of said two axial ends of the fitting body.

19. The fitting of claim 13 wherein the fitting body is symmetrical and has two axial ends, each axial end having a socket and securing portion for receiving a core and meshing with a box nut for attaching a hollow tube to each axial end of the fitting body.

20. The fitting of claim 19 wherein said fitting body is axially straight.

21. A resin-made fitting to which at least one hollow tube is connected to form a continuous passage therethrough, the fitting comprising:

a core having an annular cross section with an inner diameter larger than the inner diameter of the tube, the core being forcibly inserted into an end portion of the tube to expand the end portion, the core having an outer circumferential surface contacting an inner surface of the end portion of the tube;

a fitting body having an inner passage formed along an axial direction of the fitting body for forming a part of the continuous passage, said inner passage having an inner diameter at least as large as the inner diameter of the tube, the fitting body comprising:

a cylindrical socket portion extending axially from the fitting body and having a sealing surface at an axial end which contacts an inner surface of the tube, the socket portion having an outer diameter equal to the inner diameter of the core; and a cylindrical securing portion extending axially from the fitting body and arranged coaxially around the socket portion to form an annular insertion space between the securing portion and the socket portion to receive the core and the end portion of the tube, the core surrounding the socket portion, and the end portion of the tube located between the core and the securing portion; and a male thread portion formed on an outer circumferential surface of the fitting body, the male thread portion having a pressing surface formed perpendicular to the axial direction of the fitting body;

a box nut connecting the end of the tube to the fitting body, said box nut comprising:

a holding surface formed to mate with the sealing surface when the box nut is threaded onto the fitting body so that the tube is gripped between the holding and sealing surfaces;

an inner cylindrical surface having a female thread portion formed to mate with the male thread portion on the fitting body, the female thread portion having a pressing surface formed perpendicular to the axial direction of the box nut;

an outer cylindrical surface facing the female thread portion having a circular cross section in a direction perpendicular to the axial direction of the box nut; and an outer polygonal thread head portion axially spaced from the female thread portion for turning the box nut;

the outer circumferential surface of the core having a first tapered surface beginning at a first axial end of the core near an end face of the tube and having an increasing outer diameter in the axial direction into the tube, and a second tapered surface beginning at a second opposite axial end of the core having an increasing outer diameter in the axial direction out of the tube, said first and second tapered portions joining at an intermediate outer surface portion of the core; and a plurality of non-slip grooves formed on the first tapered surface of the core and the securing portion.

22. The fitting of claim 21, wherein said thread head portion has one of an octagon and a hexagon cross section perpendicular to the axial direction.

23. The fitting of claim 21, wherein said end portion of the tube is folded inward toward the socket portion along an axial end of the core.

24. The fitting of claim 21, wherein the core has a flange portion at an axial end thereof which is in contact with an end face of the tube.

25. The fitting of claim 21, wherein said resin is comprised of a material selected from the group consisting of poly tetrafluoroethylene (PTFE), poly propylene (PP), poly etheretherketone (PEEK), and poly phenylene sulfite (PPS).

26. The fitting of claim 21, wherein the tube is comprised of a resin.

27. The fitting of claim 21 wherein said fitting body has two axial end portions, and said socket and securing portions are formed at one of said two axial ends of the fitting body.

28. The fitting of claim 21 wherein the fitting body is symmetrical and has two axial ends, each axial end having a socket and securing portion for receiving a core and meshing with a box nut for attaching a hollow tube to each axial end of the fitting body.

29. The fitting of claim 21 wherein said fitting body is axially straight.

* * * * *